Figure 1:
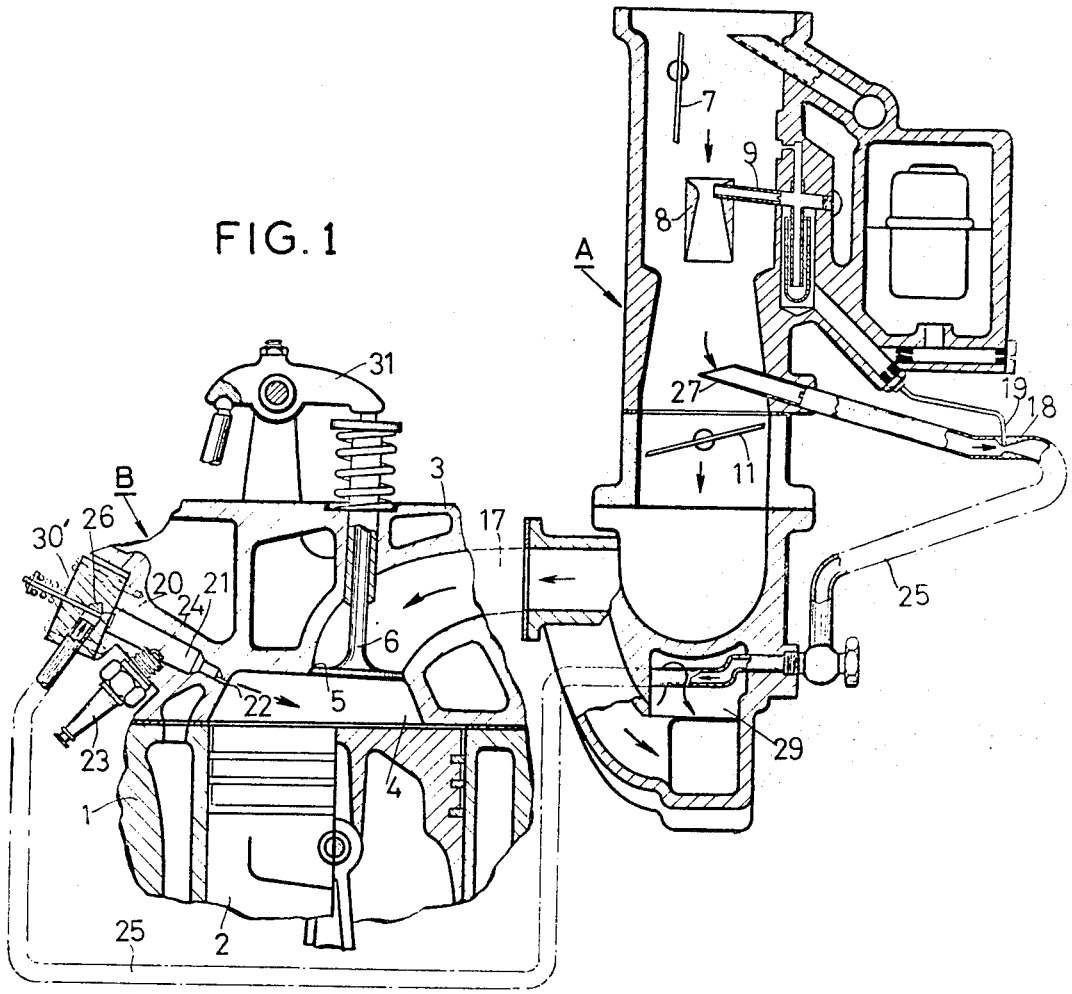

United States Patent

Suzuki et al.

[15] 3,659,564
[45] May 2, 1972

[54] INTERNAL COMBUSTION ENGINE WITH SUB-COMBUSTION CHAMBER

[72] Inventors: Toshio Suzuki, Nagoya; Yujiro Oshima, Ichinomiya; Masao Kataoka, Nagoya, all of Japan

[73] Assignee: Kabushiki Kaisha Toyota Chuo Kenkyusho, Hisakata, Showa-ku, Nagoya-shi, Aichi-ken, Japan

[22] Filed: Mar. 20, 1970

[21] Appl. No.: 21,357

Related U.S. Application Data

[62] Division of Ser. No. 772,732, Nov. 1, 1968, Pat. No. 3,543,736.

[52] U.S. Cl. .................... 123/32 SP, 123/119, 123/124, 123/127, 123/32 ST
[51] Int. Cl. ............... F02b 3/00, F02m 13/04, F02m 23/04
[58] Field of Search .............. 123/32 SP, 143 B, 127, 124, 123/119, 32

[56] References Cited

UNITED STATES PATENTS

| | | | |
|---|---|---|---|
| 2,156,665 | 5/1939 | Mallory | 123/32 |
| 2,690,741 | 10/1954 | Broderson | 123/32 |
| 3,066,661 | 12/1962 | May | 123/143 B |
| 3,363,611 | 1/1968 | Von Seggern | 123/32 |
| 3,364,911 | 1/1968 | Baudry | 123/127 |
| 3,371,914 | 3/1968 | Walker | 123/124 |
| 3,444,848 | 5/1969 | Lawrence | 123/127 |
| 3,554,174 | 1/1971 | Clawson | 125/127 |

FOREIGN PATENTS OR APPLICATIONS 800,872 5/1936 France .................... 123/32

OTHER PUBLICATIONS

Society of Automotive Engineers, Pamphlet No. 660094 Keith Rhodes, 8 pages.

*Primary Examiner*—Laurence M. Goodridge
*Assistant Examiner*—Ronald B. Cox
*Attorney*—Berman, Davidson and Berman

[57] ABSTRACT

An internal combustion engine having a cylinder, including a main combustion chamber, in combination with a sub-combustion chamber provided with an ignition plug and communicating with the main combustion chamber through a small hole in a cylinder wall for jetting out the flame of air-fuel mixture ignited in the sub-combustion chamber to the main combustion chamber, the air-fuel mixture being supplied to the sub-combustion chamber through a suction tube from the same carburetor which feeds the main combustion chamber. The carburetor inlet of said suction tube is positioned upstream of a throttle valve and downstream of a venturi portion of the carburetor. A valve is placed at the outlet of the suction tube to the sub-combustion chamber and this valve may be interconnected with a main valve in the suction manifold leading from the carburetor to the main combustion chamber to move in synchronism therewith and with a piston in the cylinder, or it may be arranged to operate automatically in response to the difference of pressure within the sub-combustion chamber and the suction tube.

2 Claims, 1 Drawing Figure

Patented May 2, 1972 3,659,564

INVENTORS.
TOSHIO SUZUKI,
YUJIRO OSHIMA,
MASAO KATAOKA,

By Berman, Davidson & Berman
ATTORNEYS.

INTERNAL COMBUSTION ENGINE WITH SUB-COMBUSTION CHAMBER

This is a division of application Ser. No. 772,732, filed Nov. 1, 1968, now U.S. Pat. No. 3,543,736.

The present invention relates to improvements in an internal combustion engine provided with a main and a sub-combustion chamber, the latter being separated from the main combustion chamber by a wall and communicating with the main combustion chamber through a small hole, or holes, so that upon ignition of fuel-air mixture in the sub-combustion chamber the resultant flame will jet out into the main combustion chamber and ignite fuel-air mixture therein.

In the most common conventional internal combustion engine, air-fuel mixture is supplied from the carburetor to the combustion chamber formed in the cylinder above the piston, and the mixture is ignited by a spark plug within the combustion chamber to give motion to the piston, but some exhaust gas remains in said chamber even after the piston arrives at the top dead center during the exhaust stroke. Subsequently, air-fuel mixture sucked into the combustion chamber during the suction stroke is diluted by the remaining exhaust gas, particularly when the proportionate amount of inhaled air is reduced in relation to the fuel as the throttle valve in the carburetor is almost closed under no-load running condition. This further reduces the efficiency of combustion by increasing the remaining unburned fuel in the exhaust, and generates injurious components in the exhaust.

Therefore, it has been proposed to modify the engine by adding a sub-combustion chamber having a spark plug and a small suction valve to the above mentioned combustion chamber, hereinafter termed the main combustion chamber, and rich air-fuel mixture is sucked from a carburetor to the sub-combustion chamber for ignition and burning therewith. As a result, the air-fuel mixture in the main combustion chamber, although excessively diluted by residual gas, is burnt by the flame jetted out from the sub-combustion chamber into the main combustion chamber.

In the above described modified conventional internal combustion engine, independent carburetors are provided for the main and sub-combustion chambers, and since the amount of air-fuel mixture fed into the sub-combustion chamber is smaller than the amount fed to the main combustion chamber, the carburetor for the sub-combustion chamber must be made considerably smaller than the carburetor for the main combustion chamber. In addition, it is necessary to provide a throttle valve in the smaller carburetor as in the carburetor for the main combustion chamber because the feed of air-fuel mixture must be controlled for meeting various kinds of driving conditions.

It has been necessary to provide a fuel supplying auxiliary carburetor device almost identical with the carburetor for the main combustion chamber, because it is necessary to retain the air-fuel ratio to be always within a proper range regardless of the change in the amount of the air supplied to the sub-combustion chamber and, therefore, it is impossible to avoid complicating the auxiliary carburetor structure if fuel combustion is to be improved.

It is a primary object of the present invention to provide an improved engine construction embodying main and sub-combustion chambers which will obviate the defects and disadvantages of conventional engines as briefly outlined above.

It is an important object of this invention to provide an internal combustion engine with a sub-combustion chamber and related parts which will improve combustion efficiency and prevent the generation of injurious components in the exhaust gas under any and all driving states and conditions.

It is another important object of this invention to provide an internal combustion engine with a sub-combustion chamber wherein the air-fuel mixture which is ignited and burned in the sub-combustion chamber is supplied from the same carburetor which supplies the main combustion chamber.

A further object of this invention is to provide an internal combustion engine with a sub-combustion chamber wherein the supply of air-fuel mixture to the sub-combustion chamber is properly regulated under any and all driving states.

Yet another object of the invention is to provide an improved internal combustion engine with a sub-combustion chamber, having the above described characteristics, which is of simple construction, and easy and economical to manufacture and use.

In accordance with the present invention, it is not necessary to provide a separate carburetor for the sub-combustion chamber, the air-fuel mixture being introduced into the sub-combustion chamber from the same carburetor supplying the main combustion chamber. The mixture is ignited by an ignition plug within the sub-combustion chamber to burn therein and the resultant flame is jetted into the main combustion chamber through a small aperture in the wall separating the two chambers. Thus, the structural drawback of providing an additional carburetor in the conventional engine with a sub-combustion chamber is removed, and at the same time, a proper mix of air and fuel is always supplied from the carburetor which feeds the main combustion chamber. With the new device, it is possible to obtain excellent combustion in any driving state of the engine.

To enable this result in the internal combustion engine of the present invention, air-fuel mixture is fed to the sub-combustion chamber by a suction tube leading from the main carburetor to the sub-combustion chamber. One end of the tube opens to the interior of the carburetor upstream of the valve and downstream of the venturi portion of the carburetor. The other end of the suction tube is connected to the suction opening of the sub-combustion chamber. In this manner excellent regulation of fuel-air mixture supplied to the sub-combustion chamber is effected, and perfect and uniform subsequent combustion of the mixture gas within the main combustion chamber can be made. The present invention is particularly effective in increasing the efficiency of combustion under no-load running, the imperfect combustion of the excessively diluted mixture gas within the main combustion chamber being completely avoided and the generation of injurious components of the exhaust gas being prevented.

The novel features that are considered characteristic of the invention are set forth with particularity in the appended claims. However, its organization and its method of operation, together with additional objects and advantages thereof, will best be understood from the following description of a specific embodiment when read in connection with the accompanying drawing, in which:

FIG. 1 is a sectional diagram illustrating an embodiment of the invention.

Referring now more particularly to the drawing, and in the embodiment as shown in FIG. 1, A generally represents the carburetor and B the upper portion of the cylinder provided with the sub-combustion chamber. The carburetor is connected to the upper portion of the combustion chamber 4 above the piston 2 within the cylinder 1, by a suction manifold 17, and the carburetor A and the sub-combustion chamber 21 are connected by a suction tube 25.

In the internal portion of the cylinder head 3, fixed on the upper portion of the cylinder 1, the main combustion chamber 4 is formed between the cylinder head and the upper surface of the piston 2 which reciprocates within the cylinder 1, and the air-fuel mixture supplied by the carburetor A is sucked through the opening 5 at the end of the manifold 17.

Opening 5 is opened or closed by the valve 6 whose stem protrudes above the cylinder head and bears against one end of a pivoted rocker arm 31, the other end of which is interconnected through a conventional mechanism with the piston 2 and regulates the amount of the air-fuel mixture sucked into the main combustion chamber. Valve 6 is resiliently biased closed by the unnumbered spring shown, said bias being overcome on downward movement of the right end of rocker arm 31.

The main nozzle 9 of the carburetor A for supplying fuel from the fuel source is opened into the venturi portion 8 downstream of the choke valve 7, and a throttle valve 11 which moves in response to the operation of the accelerator pedal is provided downstream of said main nozzle 9.

One end 27 of the suction tube 25 opens into the carburetor between the venturi portion 8 of the carburetor and the throttle valve 11 provided behind the venturi portion 8. A venturi portion 18 is formed in the suction tube 25 near end 27, and a pipe 19 for supplying fuel communicates at one end with the venturi portion 18, and at the other end with a fuel duct between an unnumbered fuel chamber and the main nozzle 9. A restricted portion is provided between said pipe 19 and said fuel duct.

The sub-combustion chamber 21 has inserted therein the igniting spark plug 23 including electrode 24 which is energized in a conventional way by a source of electricity and ignition current (not shown). Chamber 21 is integrally formed in a sidewall of the cylinder head 3, the sub-combustion chamber 21 and the main combustion chamber 4 being connected by the small hole, or holes, 22 through the wall separating them.

The sub-combustion chamber 21 has a suction opening 20 for inlet of air-fuel mixture supplied through the suction tube 25, one end 27 of the suction tube 25 opening within the carburetor as previously explained, and the other end 26 thereof opening through an outer sidewall of the sub-combustion chamber 21. Suction tube 25 passes through the exhaust manifold 29 connected to the main combustion chamber. An automatic, resiliently biased suction valve 30' for opening and closing the suction opening 20 of the sub-combustion chamber 21 opens and closes responsive to the difference of the pressure within the suction tube 25 and the pressure within the sub-combustion chamber 21.

In the operation of the above embodiment, under no-load running, the throttle valve 11 is almost totally closed. The amount of air sucked into the carburetor A is reduced by the position of valve 11, and as a result, the mixture of fuel and air supplied to the main combustion chamber 4 through manifold 17 is at low pressure. A part of the air sucked into the carburetor A together with some fuel supplied from the main nozzle 9 enters the open end 27 of suction tube 25, said end 27 having an opening directed upstream and positioned just below the end of the main nozzle 9, and moves toward the sub-combustion chamber 21. When the fuel-air mixture moves more quickly through the venturi portion 18 of the suction tube 25, additional fuel is jetted out from the fuel supply pipe 19 to enrich the mixture which, therefore, arrives at the suction opening 20 of the sub-combustion chamber 21 at higher pressure than the pressure of the air-fuel mixture within the main combustion chamber 4. This higher pressure causes the suction valve 30' of the sub-combustion chamber 21 to open, and the undiluted mixture in the tube 25 is sucked into the sub-combustion chamber 21 to drive out any remaining exhaust gas which may be there. Simultaneously, the mixture is ignited and its flame is jetted out into the main combustion chamber 4 to burn the air-fuel mixture in the main combustion chamber.

During the condition of part load running, the opening of the throttle valve 11 is increased, and the pressure of the mixture supplied to the main combustion chamber 4 is increased. The difference between the pressure of the mixture supplied to the main combustion chamber 4 and that of the mixture supplied to the suction opening 20 of the sub-combustion chamber is reduced, and the flow speed of the mixture within the suction tube 25 is lowered. As a result, the fuel jetted out from the fuel supply pipe 19 is quickly reduced, but since the opening of the throttle valve 11 is large, fuel is jetted out from the main nozzle 9, and thus the fuel carried into open end 27 of the suction tube 25 is increased over that carried in under no-load condition. The resultant pressure condition at valve 30' is sufficient to open the valve and supply the mixture to the sub-combustion chamber 21 where it is ignited, and its flame is jetted out into the main combustion chamber 4 as described for the no-load condition.

During condition of total load running, the amount and the pressure of the mixture supplied to the main combustion chamber 4 through manifold 17 are increased and, therefore, the automatic suction valve 30' of the sub-combustion chamber 21 is not opened, and no, or very little air-fuel mixture passes into the sub-combustion chamber 21 from tube 25, but the fuel mixture under high pressure in the main combustion chamber 4 is jetted into the sub-combustion chamber 21 through opening 22, and is ignited and burned therein, the flame being jetted back out into the main combustion chamber to ignite the fuel mixture therein.

Because the suction tube 25 for the sub-combustion chamber is passed through the exhaust manifold 29, the air-fuel mixture supplied into the sub-combustion chamber 21 is pre-heated, and the combustion within the sub-combustion chamber 21 is thus accelerated. The suction valve of the sub-combustion chamber used in this embodiment is an automatic valve operated by the difference of pressures at the inlets to the main and sub-combustion chambers, but a valve interconnected to compulsorily open and close with the main valve 6 can be used regardless of the carburetor construction.

It will be apparent that the invention functions to carry out perfect and uniform combustion, and especially when the air-fuel mixture in the main combustion chamber is lean, or when it is excessively diluted by remaining exhaust gas tending to cause imperfect combustion, as in no-load running. In this invention, the air-fuel mixture supplied to the sub-combustion chamber is properly regulated so as to quickly ignite and burn with great intensity, and its flame is jetted out into the main combustion chamber to carry out the perfect combustion.

Moreover, in accordance with the present invention, air-fuel mixture is supplied to the sub-combustion chamber from the same carburetor which supplies mixture to the main combustion chamber and, therefore, the structure is simple, yet the mixture supplied to the sub-combustion chamber is readily adjusted and regulated in accordance with the driving state by normal operation of the carburetor throttle.

Thus, when the present invention is employed, improved economy of fuel and the reduction of injurious components contained in the exhaust gas can be obtained.

Although a certain specific embodiment of the invention has been shown and described, it is obvious that many modifications thereof are possible. The invention, therefore, is not intended to be restricted to the exact showing of the drawing and description thereof, but is considered to include reasonable and obvious equivalents.

We claim:

1. An internal combustion engine having, in combination, a main combustion chamber in a cylinder communicating with a manifold, a sub-combustion chamber separated from said cylinder by a wall, said sub-combustion chamber communicating with said main combustion chamber by at least one small opening in said wall and having an ignition plug for igniting fuel-air mixture therein, a carburetor connected to said cylinder by the manifold for feeding fuel-air mixture thereto and having a main nozzle including a venturi portion for supplying fuel from the fuel source, and a tube for passage of fuel-air mixture connecting said carburetor to said sub-combustion chamber, said carburetor being provided with a throttle valve positioned downstream of said main nozzle, said tube having one open end projecting into said carburetor at a position between said throttle valve and said main nozzle and the other end having an outlet to the sub-combustion chamber, the open end of said tube being directed upstream and positioned just behind the venturi portion and below an end of said main nozzle, said tube having a venturi restriction therein and a fuel passage, one end of which is connected to a fuel chamber, opening at the other end into said venturi restriction.

2. An internal combustion engine according to claim 1, wherein said fuel passage is a pipe, said one end connected to the fuel chamber being connected thereto by a fuel duct through a restricted portion therein, said fuel duct being provided between said fuel chamber and said main nozzle.

* * * * *